United States Patent
Ben Hamida et al.

(10) Patent No.: US 12,513,039 B2
(45) Date of Patent: Dec. 30, 2025

(54) METHOD AND SYSTEM FOR DETECTING INCIDENTS IN AT LEAST ONE LOCAL AREA COMMUNICATION NETWORK

(71) Applicant: SAGEMCOM BROADBAND SAS, Rueil Malmaison (FR)

(72) Inventors: Elyes Ben Hamida, Rueil Malmaison (FR); Laurent Koller, Rueil Malmaison (FR); Johny Lin, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 231 days.

(21) Appl. No.: 18/078,718

(22) Filed: Dec. 9, 2022

(65) Prior Publication Data

US 2023/0198829 A1     Jun. 22, 2023

(30) Foreign Application Priority Data

Dec. 16, 2021   (FR) ...................................... 2113667

(51) Int. Cl.
*H04L 41/0654*   (2022.01)
*H04L 41/069*    (2022.01)

(52) U.S. Cl.
CPC ........ *H04L 41/0654* (2013.01); *H04L 41/069* (2013.01)

(58) Field of Classification Search
None
See application file for complete search history.

(56) References Cited

U.S. PATENT DOCUMENTS

| | | | | |
|---|---|---|---|---|
| 7,603,458 | B1 * | 10/2009 | Sexton | H04L 41/065 709/224 |
| 8,776,241 | B2 * | 7/2014 | Zaitsev | H04L 63/0263 726/25 |
| 8,966,325 | B2 * | 2/2015 | Hopper | G06F 11/008 714/25 |
| 10,666,494 | B2 * | 5/2020 | Zafer | H04L 41/0654 |
| 11,188,411 | B1 * | 11/2021 | Shen | G06F 11/079 |
| 11,204,824 | B1 * | 12/2021 | Tiwari | G06F 11/0793 |
| 11,329,862 | B2 * | 5/2022 | Gerstel | H04L 43/08 |

(Continued)

OTHER PUBLICATIONS

Jul. 5, 2022 Examination and Search Report issued in French Patent Application No. 2113667.

*Primary Examiner* — Melvin H Pollack
(74) *Attorney, Agent, or Firm* — Williams Mullen; R. Brian Drozd

(57) ABSTRACT

A method and an incident detection device in a local area network, an incident detection device being connected to the local area network by a wide area network, the local area network including a data conditioning and processing device, that: obtains, from the incident detection device, a processing repository for descriptive data from the connections between the stations and the nodes and descriptive data from the connections between the local area network nodes; aggregates the descriptive data from the connections between the stations and the nodes and the descriptive data from the connections between the nodes if the data processing repository includes information indicating that the data must be aggregated; calculates severity scores from the total severity scores according to the repository; and transfers aggregated data or severity scores to the incident detection device.

10 Claims, 5 Drawing Sheets

(56) References Cited

U.S. PATENT DOCUMENTS

| | | | | |
|---|---|---|---|---|
| 11,336,530 | B2* | 5/2022 | Goloubev | H04L 41/145 |
| 11,431,561 | B2* | 8/2022 | Smith | H04L 61/4505 |
| 11,503,063 | B2* | 11/2022 | Rao | H04L 63/1416 |
| 11,582,255 | B2* | 2/2023 | Kels | H04L 43/0817 |
| 11,606,378 | B1* | 3/2023 | Delpont | H04L 43/16 |
| 11,609,811 | B2* | 3/2023 | Ramanujan | G06Q 10/20 |
| 11,620,157 | B2* | 4/2023 | Sriharsha | G06F 16/168 714/25 |
| 11,687,438 | B1* | 6/2023 | Torbett | G06F 11/3428 702/186 |
| 11,714,700 | B2* | 8/2023 | Tiwari | H04L 41/069 714/26 |
| 11,734,704 | B2* | 8/2023 | Koval | G06N 3/04 700/291 |
| 11,743,746 | B2* | 8/2023 | Agarwal | H04L 41/14 370/252 |
| 11,757,920 | B2* | 9/2023 | Crabtree | H04L 41/12 726/22 |
| 11,775,375 | B2* | 10/2023 | Chesneau | G06F 11/079 714/2 |
| 11,838,172 | B2* | 12/2023 | Cheng | H04L 41/0631 |
| 11,838,192 | B2* | 12/2023 | Knapik | G06N 20/00 |
| 11,848,814 | B2* | 12/2023 | Srinivasan | H04L 41/0677 |
| 11,863,409 | B2* | 1/2024 | Balaiah | H04L 43/08 |
| 11,895,511 | B2* | 2/2024 | Agarwal | H04L 43/0876 |
| 12,026,074 | B2* | 7/2024 | Guim Bernat | G06F 11/263 |
| 12,034,588 | B1* | 7/2024 | Lo | H04L 41/046 |
| 12,050,969 | B2* | 7/2024 | Vaid | G06N 20/00 |
| 12,058,148 | B2* | 8/2024 | Sharifi Mehr | G06F 21/566 |
| 12,058,177 | B2* | 8/2024 | Crabtree | H04L 63/20 |
| 12,137,022 | B2* | 11/2024 | He | H04L 41/5051 |
| 12,147,880 | B2* | 11/2024 | Baumard | G06N 5/02 |
| 12,166,644 | B2* | 12/2024 | Toy | H04L 47/83 |
| 12,206,708 | B2* | 1/2025 | Crabtree | G06F 16/2477 |
| 12,212,583 | B2* | 1/2025 | Du | H04L 63/1441 |
| 12,238,539 | B2* | 2/2025 | Agarwal | H04L 41/145 |
| 2010/0027432 | A1 | 2/2010 | Gopalan et al. | |
| 2010/0312522 | A1* | 12/2010 | Laberge | G05B 23/0278 702/184 |
| 2020/0210260 | A1* | 7/2020 | Prabhakar | G06F 11/0751 |
| 2020/0267057 | A1 | 8/2020 | Garvey et al. | |
| 2022/0050738 | A1* | 2/2022 | Kanagovi | G06F 11/1453 |
| 2022/0329328 | A1* | 10/2022 | Paulraj | H04B 17/11 |
| 2023/0291752 | A1* | 9/2023 | Ben Slimen | G06N 3/09 |
| 2024/0248784 | A1* | 7/2024 | Chesneau | G06N 20/10 |
| 2024/0394139 | A1* | 11/2024 | Lushear | G06F 11/079 |

\* cited by examiner

METHOD AND SYSTEM FOR DETECTING INCIDENTS IN AT LEAST ONE LOCAL AREA COMMUNICATION NETWORK

TECHNICAL FIELD

This invention concerns the supervision of remote local area networks.

STATUS OF THE PRIOR TECHNIQUE

Local area networks that were installed initially mainly within companies have expanded very significantly to homes. These local area networks, whether wired and/or wireless, allow users to access the services offered by wide area networks such as, for example, the internet.

For example, the services are offered by internet service providers who also provide at least to a certain extent the various elements which make it possible to establish the local area network.

When an incident occurs in a local area network, the users of this local area network call on the operator's technical services to resolve the incident. To differentiate themselves and gain more value in this highly competitive market, internet service providers must offer the best digital home experience by being able to quickly diagnose an incident and resolve it as quickly as possible.

Diagnosing and resolving an incident remotely offers this quickness.

However, resolving incidents remotely requires obtaining a large amount of data from local area networks. The collection and processing of this data by servers located in a computing cloud increases proportionally with the number of local area networks to be monitored. When the number of local area networks to be supervised becomes large, the number of servers necessary for the supervision of the local area networks becomes large and providing the computing resources necessary for the supervision and the generation of advisory messages or corrective actions then becomes difficult to implement.

This invention aims to make it possible to supervise a large number of local area networks remotely while avoiding the need to deploy a large infrastructure within the computing cloud.

DESCRIPTION OF THE INVENTION

To this end, according to a first aspect, the invention proposes a method for detecting incidents in a local area network by an incident detection device, the incident detection device being connected to the local area network by means of a wide area network, the local area network comprising a data conditioning and processing device, characterized in that the method comprises the following steps:
- obtaining, by the data conditioning and processing device, from the incident detection device, of a processing repository of descriptive data from the connections between the stations and the nodes and descriptive data from the connections between the local area network nodes,
- aggregation, by the data conditioning and processing device, of descriptive data from the connections between the stations and the nodes and descriptive data from the connections between the nodes if the data processing repository includes information indicating that the data must be aggregated,
- calculation, by the data conditioning and processing device, of a severity score for each data group, a severity score for each type of anomaly and calculation of a total severity score for each data group from the severity scores calculated for the data group if the data processing repository includes information indicating that the severity scores must be calculated,
- transfer, by the data conditioning and processing device, aggregated data or severity scores to the incident detection device for generation of advisory messages or corrective actions.

The invention also concerns a data conditioning and processing device for the detection of incidents in a local area network by an incident detection device, the incident detection device being connected to the local area network by means of a wide area network, the local area network comprising the data conditioning and processing device, characterized in that the data conditioning and processing device comprises:
- means for obtaining from the incident detection device, a repository for processing descriptive data from the connections between the stations and the nodes and descriptive data from the connections between local area network nodes,
- means for aggregating the descriptive data from the connections between the stations and the nodes and the descriptive data from the connections between the nodes if the data processing repository includes information indicating that the data must be aggregated,
- means for calculating a severity score for each data group, a severity score for each type of anomaly and calculation of a total severity score for each data group from the severity scores calculated for the data group if the data processing repository includes information indicating that the severity scores must be calculated,
- means for transferring aggregated data or severity scores to the incident detection device for the generation of advisory messages or corrective actions.

Thus, this invention makes it possible to quickly diagnose an incident and resolve it as quickly as possible remotely while avoiding the need to deploy a large infrastructure within a computing cloud.

According to a particular mode of the invention, the processing repository is determined by the incident detection device from the characteristics of the data conditioning and processing device such as for example the performance in terms of computing power and/or data storage capacity of the data conditioning and processing device.

According to a particular aspect of the invention, the processing repository is determined by the incident detection device furthermore based on a health score from the local area network determined by the incident detection device from the aggregated data.

According to a particular aspect of the invention, the incident detection device:
- calculates across the total severity scores of the aggregated data groups for a predetermined duration of a total criticality score, the predetermined duration being such that a plurality of data groups are aggregated throughout the predetermined duration,
- generates advisory messages or corrective actions at least from the total criticality score.

According to a particular aspect of the invention, the incident detection device calculates the average of the total severity scores weighted by the duration of the data groups to obtain the health score of the local area network.

According to a particular aspect of the invention, the recommendations or corrective actions are also generated from the total health score.

According to a particular aspect of the invention, the data is aggregated by partitioning the data according to a predetermined periodicity, if, in a partition, no change in a link's operating characteristic appears, a data group is formed, the data group comprising all the partition's data and in each partition, with each change of at least one of the link's operating characteristic, a data group is formed, which comprises the partition's data corresponding to the link's operating characteristic.

According to a particular aspect of the invention, the recommendations are prompts to connect a station with a node of the local area network or to add a node to the local area network or to relocate a node of the local area network or to modify a channel to be used or to modify local algorithm thresholds which generate changes of channels or to remove sources of noise or to restore a configuration of the communication protocol and the corrective actions are modifications of channels or modifications of local algorithm thresholds which generate changes of channels.

This invention also concerns a system for detecting incidents in a local area network by an incident detection device, the incident detection device being connected to the local area network by means of a wide area network, the local area network comprising a data conditioning and processing device, characterized in that the system comprises:

- means for determining a processing repository by the incident detection device from the performance in computing power and/or in data storage capacity of the data conditioning and processing device.
- means for obtaining, included in the data conditioning and processing device, from the incident detection device, the processing repository of descriptive data from the connections between the stations and the nodes and descriptive data from the connections between the local area network nodes,
- means for aggregating, included in the data conditioning and processing device, the descriptive data from the connections between the stations and the nodes and the descriptive data from the connections between the nodes if the data processing repository includes information indicating that the data must be aggregated,
- means for calculating, included in the data conditioning and processing device, a severity score for each data group, a severity score for each type of anomaly and the calculation of a total severity score for each data group from the severity scores calculated for the data group if the data processing repository includes information indicating that the severity scores must be calculated,
- means for transferring, included in the data conditioning and processing device, aggregated data or severity scores to the incident detection device for the generation of advisory messages or corrective actions.

This invention also concerns a computer program product. It comprises instructions for implementing, by a device, the method according to one of the preceding processing procedures, when the aforementioned program is executed by a device processor.

This invention also concerns a storage medium. It stores a computer program comprising instructions for implementing, by a device, the method according to one of the preceding processing procedures, when the aforementioned program is executed by a device processor.

BRIEF DESCRIPTION OF THE DRAWINGS

The characteristics of the invention mentioned above, as well as others, will appear more clearly upon reading the following description of a sample processing procedure, the aforementioned description being made in relation to the attached diagrams, among which.

DETAILED DESCRIPTION OF EMBODIMENT

Figure 1:
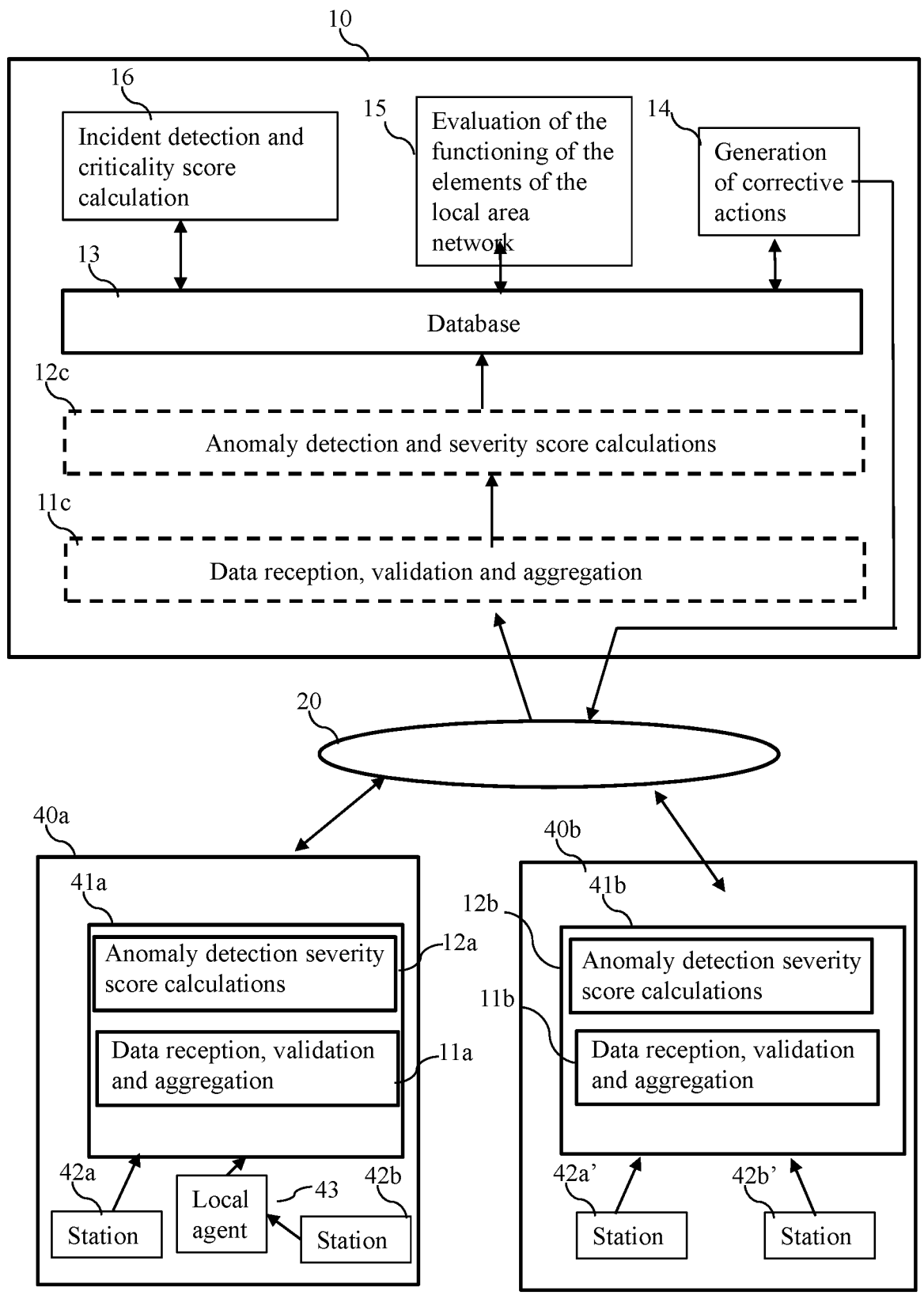
FIG. 1 schematically illustrates a telecommunications system comprising an embodiment.

FIG. 1 schematically illustrates a telecommunications system comprising an embodiment.

In FIG. 1, an incident detection device 10 is connected by means of a wide area network 20 to local area networks 40.

For example, the local area networks 40 are wired and/or wireless home networks. Only two home networks 40a and 40b are shown in FIG. 1 for the sake of simplicity. In a particular example, the local area networks 40a and 40b are Wi-Fi type wireless networks.

In the example in FIG. 1, a single incident detection device 10 is shown. The incident detection device is in a computing cloud. The various components of the incident detection device 10 can be distributed among various computing devices included in the computing cloud.

For example, the wide area network 20 is an internet type network.

In the example in FIG. 1, the local area network 40a comprises two stations 42a, 42b, a collection agent 43 and an access point or node connected to the wide area network which acts as a data conditioning and processing device 41a for the detection of incidents in the local area network 40a.

The term "node" below is understood to mean equipment offering connectivity capabilities and constituting the local area network 40a. A node is for example a residential gateway, an access point, an intelligent Ethernet router, a wireless extender, etc.

The term "station" below is understood to mean fixed or mobile equipment using the resources of the local area network by means of the nodes of the aforementioned local area network. For example, a station is a wireless mobile terminal, a printer with Ethernet connectivity, a wireless speaker . . .

The collection agent 43 transfers the collected data to the data conditioning and processing device 41a.

The local area network 40b comprises two stations 42a', 42b' and an access point connected to the wide area network which acts as a data conditioning and processing device 41b for the detection of incidents in the local area network 40b.

For example, the access points are gateways between the wide area network 20 and the local area networks 40a or 40b.

It should be noted here that each node can collect data in the local area network 40a or 40b.

For example, the collection agent 43 is implemented into a node and collects data in the local area network 40a.

The installation of the access point and stations in a home can generate incidents, such as the size, the composition of the home, and the number of stations.

Likewise, in a wireless local area network compatible with one of the standards of the IEEE 802.11 family of standards, sometimes referred to as Wi-Fi type technology, interference with adjacent networks or devices transmitting radio waves in the same frequency band may appear.

The use in the same local area network of several services such as streaming, home automation, internet television, online games, the Internet of Things, etc. may also interfere with some of these services.

Each data conditioning and processing device 41a or 41b obtains descriptive data from the connections between stations and local area network nodes 40a or 40b and descriptive data from the connections between the nodes related to the quality and use of the local area network. These data are collected at regular intervals and are stored locally in each node. These data are then sent at regular intervals by each node to the data conditioning and processing device.

Each data conditioning and processing device 41a or 41b, according to a processing repository received by each data conditioning and processing device 41a or 41b of the incident detection device 10, processes this data. The results of these processing operations are sent to the incident detection device 10.

For example, the data collected are, but not limited to, the list of local area network nodes and their functions, for example, internet gateway, Wi-Fi repeater, set-top box as well as their descriptive data, Domain Name System "DNS" server, file or printing server, for example, the software version, the IP address, the MAC address, the wireless or wired standard(s) supported, the radio band(s) supported and/or used.

For example, the data collected are, but not limited to, the list of connections or links between the stations and the nodes, the list of connections between the nodes as well as their descriptive data, for example a timestamp, signal strength or RSSI (acronym for the term Received Signal Strength Indicator), noise level, volume of bytes sent and/or received, the use of the radio channel(s), the frequency band, the number of packets transmitted and/or received and/or lost and/or retransmitted.

Other metrics representative of the nominal operation of each piece of equipment, such as nodes or stations in the local area network, may also be considered. Furthermore, this equipment can be connected via wireless technology according to one of the standards of the IEEE 802.11 family of standards, but also an energy efficient wireless communication technology for the Internet of Things "IoT", but also a "BlueTooth" type technology, or a wired access technology such as Ethernet or through a power line. In one example, a metric representative of the energy consumption of a piece of equipment can be collected. In another example, a 10 Mbps/100 Mbps/1000 Mbps Ethernet link speed metric can also be collected.

The data processing results are sent, for example, in a message in a JSON format (acronym for JavaScript Object Notation) or in a message in an XML extensible markup language (acronym for eXtensible Markup Language) using a communication protocol, such as HTTP (Hypertext Transfer Protocol) or MQTT (Message Queuing Telemetry Transport).

It should be noted here that the message is sent at predetermined times and/or at the request of the incident detection device 10.

Each data conditioning and processing device 41a or 41b comprises a data reception, validation and aggregation module 11a respectively 11b which receives and processes each message received containing grouped data.

The data reception, validation and aggregation module 11a or 11b validates the content of each message received, for example by checking if the format of the message received is compliant, if the repository version is admissible, if the information values included in the message received are within a consistent value range.

If so, the data reception, validation and aggregation module 11a or 11b aggregates into data groups the descriptive data from the connections between the stations and the nodes and the descriptive data from the connections between the nodes.

For example, the data is partitioned according to a predetermined periodicity, for example equal to 10 minutes.

If no change in the operating characteristic of a link appears in a partition, a data group is formed, the data group comprising all the partition's data.

In each partition, with each change of at least one operating characteristic of a link, a data group is formed, which includes the data from the partition corresponding to the frequency band, the channel and the communication protocol.

An operating characteristic of a link is, for example and not limited to, the frequency band, the channel and the communication protocol such as for example the wireless communication protocol.

More precisely, a data group comprises data, for a period of 10 minutes, obtained for the frequency band and the channel and the communication protocol used during the aforementioned predetermined period. A data group includes, for a duration of use of the same frequency band, the same channel and the same communication protocol used, the data obtained for the frequency band and the channel and the communication protocol used. An example of aggregation is given with reference to FIG. 4.

Figure 4:
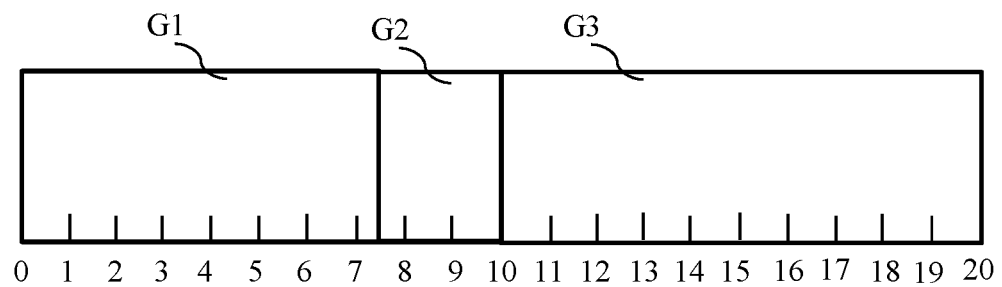
FIG. 4 schematically illustrates an example of data aggregation according to an embodiment.

FIG. 4 schematically illustrates an example of data aggregation according to an embodiment In the example in FIG. 4, the data received during the first ten minutes denoted 0 to 9 are not obtained for the same frequency band, for the same channel and for the same communication protocol used, two groups denoted G1 and G2 are formed.

Group G1 includes data obtained on the 2.4 GHz frequency band, channel 1 and the 802.11n protocol. Group G2 includes data obtained on the 2.4 GHz frequency band, channel 6 and the 802.11n protocol.

The data received during the subsequent ten minutes denoted 10 to 19 are obtained for the same frequency band, for the same channel and for the same communication protocol used. Group G3 is formed.

Group G3 includes data obtained on the 2.4 GHz frequency band, channel 6 and the 802.11n protocol.

For the following time ranges, other groups may be considered. For example, when changing the frequency band from the aforementioned 2.4 GHz band to the aforementioned 5 GHz band, and/or when changing the 802.11n standard to 802.11ac or 802.11ax or 802.11be.

The groups are thus used to smooth out the data sent by the nodes by aggregating them. For each data group, the variation of the byte and packet volume counters within the group is calculated, as well as the minimum, the maximum and the average of a certain number of metrics such as for example the RSSI, the noise . . .

Each data conditioning and processing device 41a or 41b includes a module for detecting anomalies and calculating severity scores 12a or 12b.

The anomaly detection and severity score calculation module 12a or 12b for each data group and each type of anomaly calculates a normalized severity score, for example within the limit between 0 and 1 for the various metrics.

The severity score makes it possible to evaluate the deviation of these metrics from predetermined values representative of normal functioning or behavior.

A severity score of 0 means that there is no anomaly, a severity score of 1 means significant interference on the Wi-Fi link for the group.

For example, the severity score with a "radio coverage" type anomaly is 0 for an RSSI greater than or equal to −60 dBm and increases linearly to 1 for an RSSI of −80 dBm and above.

Indeed, an RSSI level of −60 dBm may be representative of good signal reception quality by one of the stations whose RSSI data are incorporated into one of the groups. A perceived RSSI level of −80 dBm is representative of a noisy signal reception compared to a level of −60 dBm, which can produce or indicate a degradation in transmission within the local area network 40.

For example, the severity score for the "noise level" type anomaly for a node is 0 for noise less than or equal to −80 dBm and increases linearly to 1 for noise of −60 dBm and above.

For example, the severity score for the "channel change" type anomaly for a node is 0 for a channel change number less than or equal to 2 and increases linearly to 1 for a channel change number greater than or equal to 5 for a period of time equal to 30 minutes.

For example, the severity score for the "node change" type anomaly for a station is 0 for a node change number less than or equal to 2 and increases linearly to 1 for a node change number greater than or equal to 5 for a period of time equal to 30 minutes.

In the examples above, the respective severity scores are obtained by linear growth or interpolation with the advantage of simplicity of calculations for a large volume of data, severity score comparisons are thus facilitated.

In other examples, the respective severity scores are obtained in accordance with other methods or means of calculation. For example, the severity score for the "radio coverage" type anomaly is obtained according to a "lookup table" type table in which for certain RSSI values or certain RSSI value ranges, a score is assigned.

This table can be obtained for example by defining RSSI ranges of 3 dBm, representative of a perceived signal level divided by 2: the score 0 is assigned to the range [−60 dBm; −63 dBm[, the score 0.25 is assigned to the range [−63 dBm; −66 dBm[, the score 0.5 is assigned to the range [−66 dBm; −69 dBm[, the score 0.75 is assigned to the range [−69 dBm; −72 dBm[, the score 0.99 is assigned to the range [−72 dBm; −80 dBm]. In this last range, the severity score of 0.99 for radio coverage whose RSSI is included in this range is an indicator that the reception level is too noisy in order for transmissions to or from the station to be effective. Severity scores are calculated for each element of the local area network.

Each anomaly detection and severity score calculation module 12a or 12b therefore calculates, for each data group, a severity score for each type of anomaly.

The anomaly detection and severity score calculation module 12a or 12b also calculates severity scores for one or more elements of the local area network by only taking into account the data relating to the element of the local area network.

The anomaly detection and severity score calculation module 12a or 12b calculates, for each data group, a total severity score from the severity scores calculated for the data group.

To do this, score composition laws are defined:

A first law of addition: $s_1 \oplus s_2 = f_+(S_1+S_2)$

With $$S_1 = f_-(s_1),\ S_2 = f_-(s_2),\ f_+(x) = \frac{x}{1+x},\ f_-(x) = \frac{x}{1-x}$$

and $\oplus$ is the direct sum operator.

where $s_1$ is for example the severity score for the "radio coverage" type anomaly and $s_2$ is for example the severity score for the "byte volume" type anomaly.

A second multiplication law $m*s=f_+(mS)$, with $S=f_-(s)$ et $m \in [0, \infty[$.

The total severity score $s'_i$ is given by $\oplus_{i=1}^{n} s_i$, where n is the number of anomalies $s_i$ is the severity score for the anomaly type indexed by the index i.

The set [0; 1[ and the laws ($\oplus$,*) possess most of the properties of a casing structure, with the exception that law $\oplus$ is not invertible. Functions $f_-$ and $f_+$ then produce homeomorphisms respectively to and from (R, +, x) guaranteeing the following properties:

$0*s=0$ $1*s=1$ $m*1=1$ $f_-(m*s)=m \times f_-(s)$ $s \oplus s = 2*s$ $m_1*(m_2*s)=(m_1/*m_2)*s$ $m*(s_1 \oplus s_2)=(m*s_1) \oplus (m*s_2)$ $s_1 \oplus s_2 = s_2 \oplus s_1$ $s_1 \oplus (s_2 \oplus s_3) = (s_2 \oplus s_1) \oplus s_3$ This total severity score is also between 0 and 1, it increases with the other severity scores, and it is equal to one when one of the severity scores is equal to one.

The anomaly detection and severity score calculation module 12a or 12b also calculates total severity scores for one or more elements of the local area network by only taking into account the data relating to the element of the local area network.

The results provided by the anomaly detection and severity score calculation module 12a or 12b or by the data reception, validation and aggregation module 11a respectively 11b are transferred to the incident detection device 10 according to the processing repository received by each data conditioning and processing device 41a or 41b from the incident detection device 10.

The incident detection device 10 potentially comprises a data reception, validation and aggregation module 11c which receives and processes each message received comprising data.

The data reception, validation and aggregation module 11c validates the content of each message received, for example by checking if the format of the message received is compliant, if the values of the information included in the message received are within a consistent value range and if the local area network from which the message originates is part of the set of local area networks managed by the incident detection device 10.

The data reception, validation and aggregation module 11c aggregates into data groups the descriptive data from the connections between the stations and the nodes and the descriptive data from the connections between the nodes in the same manner as the reception, validation and data aggregation modules 11a and 11b.

The incident detection device 10 potentially includes an anomaly detection and severity score calculation module 12c.

The anomaly detection and severity score calculation module 12c, for each data group and each type of anomaly provided by the data reception, validation and aggregation module 11a or 11b 11c, calculates a score within the limits between 0 and 1 called severity for the various metrics in the same manner as the anomaly detection and severity score calculation modules 12a and 12b.

Each severity and total severity score received from a data conditioning and processing device 41a or 41b or processed by the anomaly detection and severity score calculation module 12c is stored in a database 13.

The incident detection device 10 comprises a module for evaluating the operation of the elements of the local area network 15.

The module for evaluating the operation of the elements of the local area network 15 calculates at least one health indicator of the local area network and/or calculates a health score respectively for one or more elements over a time range, for example over a day. An element is for example and not limited to a node, a link, etc. . . .

The purpose of the health indicator is to construct a score bounded by limits in order to be able to compare different local area networks and/or different elements or different time ranges without considerations of scale: the health of a large network does not have to be penalized due to its size, it is normal to find that it has more anomalies than a small network. For a set of groups, the module for evaluating the operation of the elements of the local area network 15 calculates the average of health scores weighted by the duration of the groups.

A health score can be assigned to any set of data groups: a local area network over a day. This health score is limited between 0 and 1, and can therefore be converted into any health indicator scale (e.g. percentage, index between 1 and 5, etc.).

The health score is calculated according to the following formula:

$$H = 1 - \frac{\Sigma_{links} t_i \times s'_i}{\Sigma_{links} t_i}$$

where $t_i$ is the group's connection time i, $s'_i$ the total severity score for the data group.

The module for evaluating the operation of the elements of the local area network 15 also calculates health scores for one or more elements of the local area network by only taking into account the total severity scores relating to the element of the local area network.

The health score makes it possible to visually represent/synthesize the level of health of a local area network and to compare it to other local area networks. It is for example used by the operator who is responsible for analyzing the performance and the level of health of the local area networks at a subscriber base level.

The health scores calculated for elements of the local area network make it possible to visually represent/synthesize the level of health of an element of the local area network and to compare it to other elements of the local area network and/or elements of other local area networks.

The data calculated by the module for evaluating the operation of the elements of the local area network 15 are stored in the database 13.

The incident detection device 10 comprises an incident detection and criticality score calculation module 16.

The incident detection and criticality score calculation module 16 performs a periodic analysis, for example daily, in order to detect local area network incidents and to propose appropriate recommendations.

An incident, unlike anomalies, generally occurs over several hours, for example throughout the day. Depending on the type of incident, it may concern a station, for example linked to the station's use of an obsolete standard, a radio link, for example poor packet transmission, or an access point, for example a high level of noise.

Each type of incident is linked to a type of anomaly. To determine if there is an incident, the incident detection and criticality score calculation module 16 calculates across all the groups concerned the connection duration weighted by the associated total severity. This criticality score, which is expressed in seconds, is called the total criticality score:

$$c = \sum_{groups} t_i \times s'_i$$

where $t_i$ is the connection time of the group i, $s'_i$ is the total severity score of the anomaly and the summation is performed across all the data groups affected by the incident.

An incident therefore makes it possible to see if the criticality linked to an anomaly is problematic over a day: it is spread out over time, with a non-zero severity. It is deemed that there is indeed an incident if the calculated criticality score exceeds a benchmark duration, for example 600 seconds, i.e. anomaly of 10 minutes with maximum severity.

Figure 5:
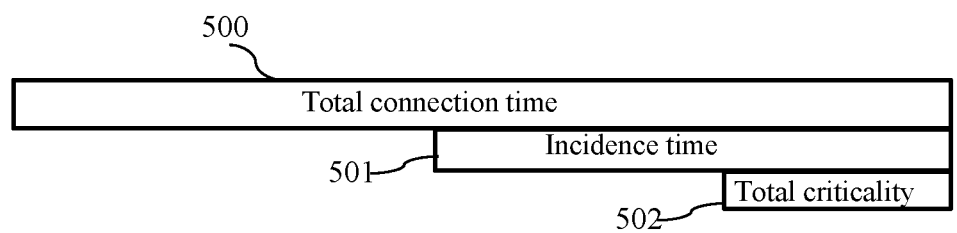
FIG. 5 illustrates the principle of calculating the criticality of an incident by an incident detection module and calculating criticality scores.

Total criticality is the preferred metric for measuring the impact of an incident on the local area network. The most serious incidents are those that impact the largest number of local area network links, for the longest amount of time and the most severely. It is sometimes worthwhile considering the incidence time instead, i.e. the cumulative duration of all the groups affected by the incident. By construction, the total criticality 502 is less than or equal to the incidence time 501, itself less than the total connection time over the time range 500, as illustrated in FIG. 5.

For example, if the total criticality score is greater than 40% of the total duration of connections, corrective actions can be taken depending on the type of incident.

If the user has been impacted for more than 4 hours out of a total of 10 hours of connections, the incident is, for example, deemed relatively serious and corrective actions can be taken.

The incident detection and criticality score calculation module 16 also calculates total criticality scores for one or more elements of the local area network by only taking into account the total severity scores relating to the element of the local area network.

The incident detection device 10 includes a corrective action generation module 14.

The corrective action generation module 14 generates recommendations or corrective actions to improve the operation of one or more local area networks. The recommendations are for example transferred to the local area network's internet service provider and/or to the local area network's users.

For example, the corrective action generation module 14 identifies the local area network or networks for which the total criticality score is greater than or equal to a predetermined threshold, for example equal to 0.4.

Corrective actions can be generated by analyzing the health score and/or the total criticality score of the local area network and/or by analyzing the health score and/or the total criticality score of one or more elements of the local area network.

Corrective actions represent actions that can be automated on the equipment concerned. Thus, the incident detection device 10 identifies, from the total criticality scores, for example at the end of a day, the equipment that requires optimizations and/or configuration changes.

The corrective action generation module 14 having identified the network or networks for which the total criticality score and/or health score is greater than or equal to the predetermined threshold generates corrective actions by analyzing the severity scores recorded during the day.

The list of corrective actions is sent to these devices using, for example, the HTTP (Hypertext Transfer Protocol) or MQTT (Message Queuing Telemetry Transport) protocol.

If a coverage type incident is detected, for example, by analyzing the health score and/or the total criticality score of the local area network and/or by analyzing the health score and/or the total criticality score of one or several elements of the local area network and by analyzing the severity scores relating to types of anomalies such as "low power level in signal reception" (RSSI<−77 dBm), the corrective action generation module 14 transfers to the local area network's internet service provider and/or to the local area network's users a message suggesting the addition of a new node (or access point) at the level of the local area network in order to improve the local area network's overall coverage.

For example, if the problem of a node's incorrect positioning is detected, for example by analyzing the severity scores relating to the change of a node or channel, the corrective action generation module 14 transfers to the local area network's internet service provider and/or the local area network's users a message prompting them to relocate a node, for example a repeater node of the local area network's internet gateway.

If a frequent node channel change type incident is detected, for example, by analyzing the health score and/or the total criticality score of the local area network and/or by analyzing the health score and/or the total criticality score of one or more elements of the local area network and by analyzing the severity scores relating to types of anomalies such as "frequent channel changes", the corrective action generation module 14 transfers to the local area network's internet service provider and/or to the local area network's users a message suggesting to the users and/or nodes to fix the channel to be used and/or to modify the local algorithm thresholds that generate channel changes.

For example, if a noise problem is detected, for example by analyzing the severity scores relating to the noise level, the corrective action generation module 14 transfers to the local area network's internet service provider and/or to the local area network's users a message prompting them to relocate or even remove sources of noise and/or, as a corrective action, a message informing a node to change the frequency band.

If a noise type incident is detected, for example, by analyzing the health score and/or the total criticality score of the local area network and/or by analyzing the health score and/or the total criticality score of one or several elements of the local area network and by analyzing the severity scores relating to types of anomalies such as "very high noise level around a node or station, the corrective action generation module 14 transfers to the local area network's internet service provider and/or to the local area network's users a message suggesting to the users and/or nodes to switch to another channel and/or Wi-Fi band where the noise level is lower.

For example, if a configuration type incident according to a standard or non-standard protocol is detected, for example, by analyzing the health score and/or the total criticality score of the local area network and/or by analyzing the health score and/or or the total criticality score of one or more elements of the local area network and by analyzing the severity scores relating to types of anomalies such as "obsolete standards used", the corrective action generation module 14 transfers to the local area network's internet service provider and/or to the local area network's users a message suggesting to the users and/or nodes to restore the default Wi-Fi configuration. Alternatively, the corrective action generation module 14 cooperates with the incident detection device 10 in order for the latter to send a message to the local area network concerned by the standard configuration type incident or non-standard protocol in order for a corrective measure to be taken. This corrective measure can be, for example, to prohibit a station or terminal in connection with this standard or non-standard protocol from connecting to the local area network concerned.

Figure 2:
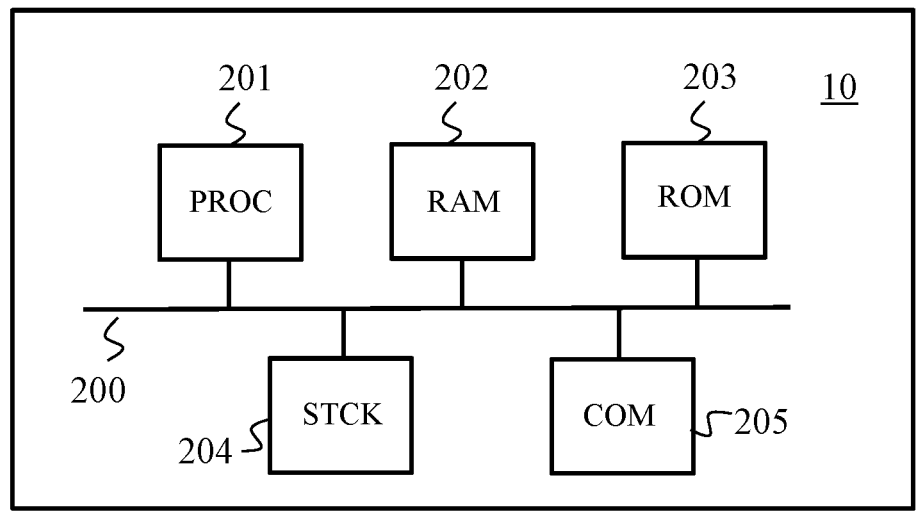
FIG. 2 schematically illustrates an example of hardware architecture of an incident detection device in at least one local area network.

FIG. 2 schematically illustrates an example of hardware architecture for an incident detection device in at least one local area network.

According to the hardware architecture example shown in FIG. 2, the incident detection device 10, connected by a communication bus 200, comprises: a processor or CPU (Central Processing Unit) 201; random access memory RAM 202; ROM (Read Only Memory) 203; a storage unit such as a hard disk (or a storage medium reader, such as an SD (Secure Digital) card reader 204; at least one communication interface 205 making it possible for the incident detection device 10 to communicate by means of the wide area network 20.

Processor 201 is capable of executing instructions loaded onto the RAM 202 from the ROM 203, external memory (not shown), storage medium (such as an SD card), or a communications network. When the incident detection device 10 is switched on, the processor 201 is capable of reading instructions from the RAM 202 and execute them. These instructions form a computer program producing the implementation, by the processor 201, of all or part of the method described in relation to FIG. 7.

Figure 7:
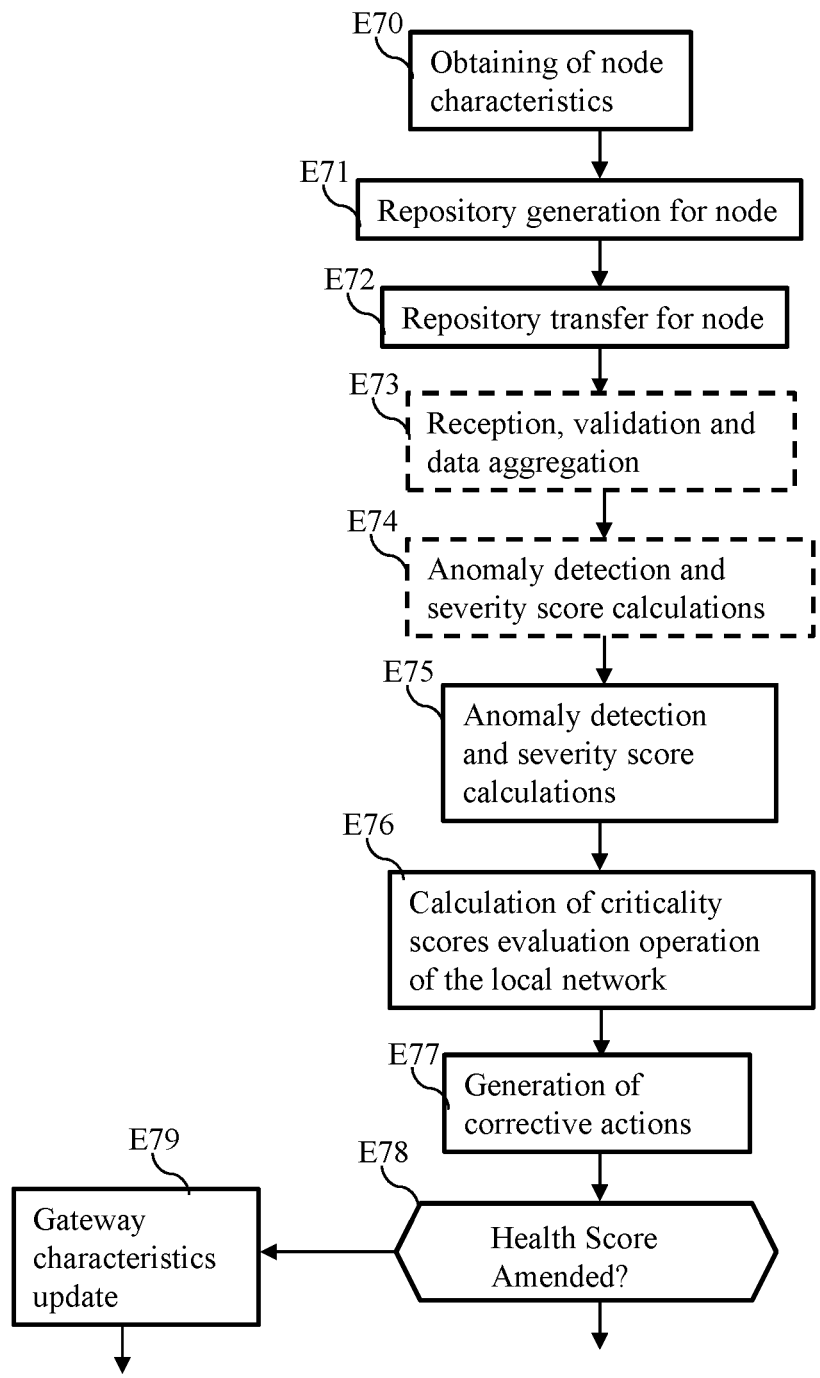
FIG. 7 schematically illustrates a method for detecting incidents in a local area network.

The method described below in relation to FIG. 7 can be implemented as software by executing a set of instructions by a programmable machine, for example a DSP (Digital Signal Processor) or a microcontroller, or be implemented as hardware by a dedicated machine or component, for example an FPGA (Field-Programmable Gate Array) or an ASIC (Application-Specific Integrated Circuit). In general, the incident detection device 10 comprises electronic circuitry configured to implement the method described in relation to FIG. 7.

It should be noted here that FIG. 2 represents a hardware architecture for a single incident detection device 10. The different components of the incident detection device 10 can be distributed among different computing devices included in the computing cloud.

Figure 3:
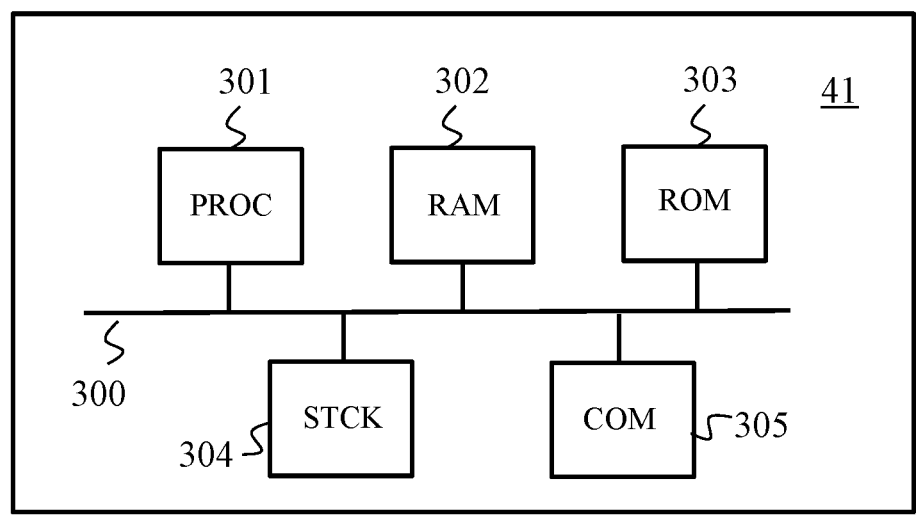
FIG. 3 schematically illustrates an example of hardware architecture of a data conditioning and processing device for detecting incidents in a local area network.

FIG. 3 schematically illustrates an example of hardware architecture for a data conditioning and processing device for the detection of incidents in a local area network.

According to the hardware architecture example shown in FIG. 3, the data conditioning and processing device 41*a* or 41*b*, connected by a communication bus 300, comprises: a processor or CPU (Central Processing Unit) 301; random access memory RAM 302; read only memory ROM 303; a storage unit such as a hard disk or a storage medium reader, such as an SD (Secure Digital) card reader 204; at least one communication interface 305 making it possible for the data conditioning and data processing device 41*a* or 41*b* to communicate by means of the wide area network 20.

The processor 301 is capable of executing instructions loaded onto the RAM 302 from the ROM 303, external memory (not shown), storage medium (such as an SD card), or a communications network. When the data conditioning and processing device 41*a* or 41*b* is switched on, the processor 301 is capable of reading instructions from the RAM 302 and executing them. These instructions form a computer program producing the implementation, by the processor 301, of all or part of the method described in relation to FIG. 6.

The method described below in relation to FIG. 6 can be implemented as software by executing a set of instructions by a programmable machine, for example a DSP (Digital Signal Processor) or a microcontroller, or be implemented as hardware by a dedicated machine or component, for example an FPGA (Field-Programmable Gate Array) or an ASIC (Application-Specific Integrated Circuit). In general, the data conditioning and processing device 41*a* or 41*b* comprises electronic circuitry configured to implement the method described in relation to FIG. 6.

Figure 6:
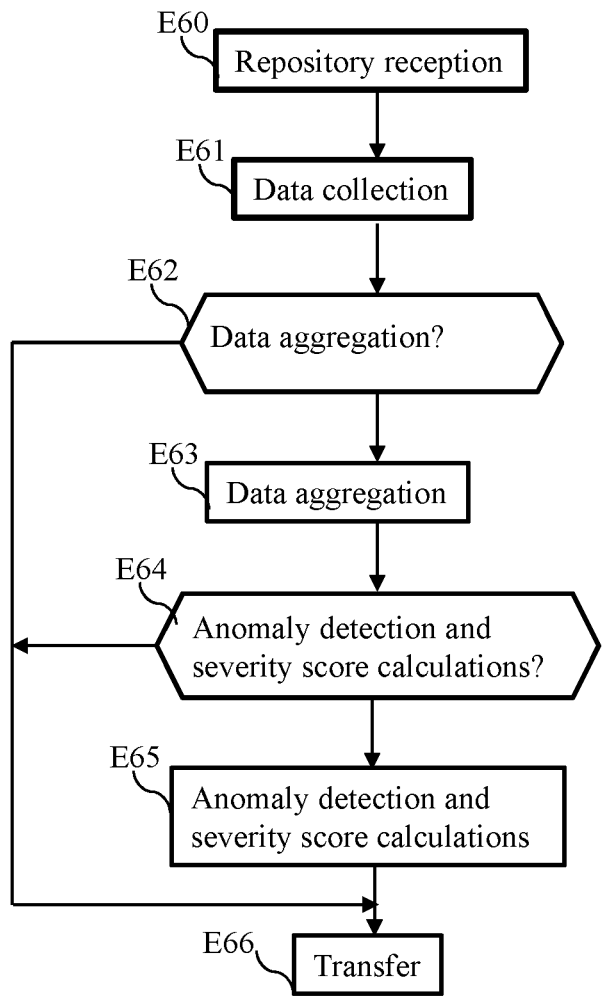
FIG. 6 schematically illustrates a data conditioning and processing method for the detection of incidents in a local area network.

FIG. 6 schematically illustrates a data conditioning and processing method for the detection of incidents in a local area network.

The method is executed by each data conditioning and processing device 41*a* and 41*b* periodically.

At step E60, the conditioning and processing device checks if a processing repository is available.

The processing repository is for example transmitted by the incident detection device 10 or the conditioning and processing device inquires of the incident detection device 10 periodically or when the conditioning and processing device is switched on.

A processing repository includes a list of metrics to be collected, the sampling frequencies according to the kind of metrics collected (for example 30 seconds for metrics related to wireless links and 30 seconds for system metrics), the kind of aggregations (for example, an average and/or a maximum value and/or a maximum value, and a window of time to be applied for the data aggregation (for example 10 minutes), the anomaly detection rules, if the calculation of the associated severity scores need to be calculated, the frequencies for sending the processed data.

It should be noted here that the frequency of sending metrics can be postponed depending on the nature or structure of the data (for example: 30 minutes for data collected periodically, 24 hours for daily data).

At step E61, the conditioning and processing device gives instructions for the collection and aggregates the data according to the rules included in the processing repository.

At step E62, the conditioning and processing device checks if the processing repository includes information relating to the execution of the data aggregation and any rules to be applied for the data aggregation.

If data aggregation needs to be performed, the conditioning and processing device moves to step E63. If not, the conditioning and processing device moves to step E66.

At step E63, the conditioning and processing device aggregates the data according to the rules defined in the processing repository.

At step E64, the conditioning and processing device checks if the processing repository includes information relating to the execution of the detection of anomalies and the calculation of severity scores. If so, the conditioning and processing device moves to step E65. If not, the conditioning and processing device moves to step E66.

At step E65, the conditioning and processing device detects anomalies for each group by calculating the score with limits between 0 and 1 called the severity score for the various metrics.

The severity score makes it possible to evaluate the deviation of these metrics from predetermined values representative of normal functioning or behavior.

A severity score of 0 means that there is no anomaly, a severity score of 1 means significant perturbation on the radio or wired link for the group.

The conditioning and processing device therefore calculates, for each data group, a severity score for each type of anomaly.

The conditioning and processing device also calculates severity scores for one or more elements of the local area network by only taking into account the data relating to the element of the local area network.

The conditioning and processing device calculates, for each data group, a total severity score based on the severity scores calculated for the data group.

This total severity score is also between 0 and 1, it increases with the other severity scores, and it is equal to one when one of the severity scores is equal to one.

At step E66, the conditioning and processing device gives instructions to transfer the data collected at step E61 or the aggregated data at step E63 or the severity and/or total severity scores calculated At step E65 according to the rules included in the processing repository. FIG. 7 schematically illustrates a method for detecting incidents in a local area network.

At step E70, the incident detection device 10 obtains for each gateway housing a conditioning and processing device the characteristics of the latter. The gateways for the various local area networks are not identical. Various types of gateways coexist and do not have the same characteristics. These characteristics are for example related to performance in terms of computing power, data storage capacity, etc. Some are only capable of performing data aggregation, others are not, others are capable of performing both data aggregation and severity score calculations and anomaly calculations. Some gateways can be connected to the wide area network via a "copper" connection using an "asymmetric digital subscriber line" technology called "ADSL" or "high speed digital subscriber line 2" called "VDSL2", other gateways can be connected to the wide area network using a fiber optic connection, and still other gateways can be connected by a 4G or 5G Fixed Wireless Access "FWA" type wireless link. Some gateways can offer various types of wide area network connectivity.

According to a particular processing procedure, the characteristics of a gateway include a health score that is defined according to a processing procedure. A gateway that is capable of performing both data aggregation and severity score calculations and anomaly calculations when it has a bad health score may only be allocated a reduced amount of processing transactions to perform in its processing repository.

A gateway health score or system health score is for example based on at least one characteristic of the gateway such as the use of its processor(s), its RAM memory.

This system health score varies for example from 0% to 100%.

A system health score of 0% indicates a very high demand on the processor(s), its RAM memory and other system resources which significantly impact the performance of the gateway.

A score of 100% shows a low use of the equipment's system resources during its operation.

A threshold can be applied to signal an excessive use threshold of the equipment's resources.

For example, this score can be set at 50% or 0.5 to signal poor health of the equipment's resources.

This poor system performance of the equipment's system is monitored by the incident detection device 10. The incident detection device 10, in the event of a system health score below the threshold of use, can dynamically modify the equipment's processing repository. A processing repository with simplified calculation and aggregation instructions may be applied in this case.

At step E71, the incident detection device 10 generates, for each gateway, a processing repository from the characteristics of the latter.

At step E72, the incident detection device 10 transfers to at least some of the conditioning and processing devices or makes available to each conditioning and processing device a processing repository adapted to the conditioning and processing device.

When a conditioning and processing device sends data to the incident detection device, the incident detection device aggregates the data at step E73 as described in step E63 of FIG. 6 and validates the data prior to aggregation.

When a conditioning and processing device sends aggregated data, the incident detection device performs step E74 of detecting anomalies and calculating severity scores as described in step E65 of FIG. 6.

At step E75, the incident detection device 10 calculates, from the severity scores calculated at step E74 or received from a conditioning and processing device, at least one health indicator for the local area network and/or calculates a health score respectively for one or more elements over a day. An element is for example and not limited to the gateway, a node, a link, etc. . . .

The purpose of the health score is to construct a limited score to be able to compare various local area networks and/or various elements or various time ranges without scale considerations: the health of a large network does not have to be penalized due to its size, it is normal to find that it has more anomalies than a small network.

For a set of groups, the incident detection device 10 calculates the average of the health scores weighted by the duration of the groups.

A health score can be assigned to any set of data groups: a local area network over a day. This health score is limited between 0 and 1, and can therefore be converted into any health indicator scale (e.g. percentage, index between 1 and 5, etc.).

The health score is calculated according to the following formula:

$$H = 1 - \frac{\Sigma_{links} t_i \times s'_i}{\Sigma_{links} t_i}$$

where $t_i$ is the connection time of the group i, $s'_i$ the total severity score of the data group.

The incident detection device 10 also calculates health scores for one or more elements of the local area network by only taking into account the total severity scores relating to the element of the local area network.

The health score makes it possible to visually represent/synthesize the local area network's health level and to compare it to other local area networks. For example, it is used by the operator who is responsible for analyzing the performance and the health level of local area networks at the subscriber base level.

The health scores calculated for elements of the local area network make it possible to visually represent/synthesize the health level of an element of the local area network and to compare it to other elements of the local area network and/or to elements of other local area networks.

At step E76, the incident detection device 10 calculates criticality scores.

The incident detection device 10 performs an analysis over a time range, for example daily, in order to detect local area network incidents and to propose appropriate recommendations.

An incident, unlike anomalies, occurs across several hours, for example throughout the day. Depending on the type of incident, it may concern a station, for example linked to the gateway's use of an obsolete standard, a radio link, for example poor packet transmission, or an access point, for example a high level of noise.

Each type of incident is linked to a type of anomaly. To determine if there is an incident, the incident detection device 10 calculates across all the groups concerned the connection duration weighted by the associated total severity. This criticality score, which is expressed in seconds, is called the total criticality score:

$$c = \sum_{groups} t_i \times s'_i$$

where $t_i$ is the connection time of the group i, $s'_i$ is the total severity score of the anomaly and the summation is performed across all the data groups affected by the incident.

An incident therefore makes it possible to see if the criticality linked to an anomaly is problematic over a day: it is spread out over time, with a non-zero severity. It is deemed that there is indeed an incident if the calculated criticality score exceeds a benchmark duration, for example 600 seconds, i.e. anomaly of 10 minutes with maximum severity.

Total criticality is the preferred metric for measuring the impact of an incident on the local area network. The most serious incidents are those that impact the largest number of local area network links, for the longest amount of time and the most severely.

For example, if the total criticality score is greater than 40% of the total duration of connections, corrective actions can be taken according to the type of incident.

If an element of the local area network (gateway, or node, or link, or terminal, etc.) has been impacted for more than 4 hours out of a total of 10 hours of connections, the incident is, for example, deemed relatively serious and corrective actions can be taken.

The incident detection device 10 also calculates total criticality scores for one or more elements of the local area network by only taking into account the total severity scores relating to the element of the local area network.

At step E77, the incident detection device 10 generates recommendations or corrective actions to improve the operation of one or more local area networks. The recommendations are for example transferred to the local area network's internet service provider and/or to the local area network's users.

For example, the incident detection device 10 identifies the local area network or networks for which the total criticality score is greater than or equal to a predetermined threshold, for example equal to 0.4.

Corrective actions can be generated by analyzing the health score and/or the total criticality score of the local area network and/or by analyzing the health score and/or the total criticality score of one or more elements of the local area network.

Corrective actions represent actions that can be automated on the equipment concerned. Thus, the incident detection device 10 identifies, based on the total criticality scores, for example at the end of a day, the equipment requiring optimizations and/or configuration changes.

The incident detection device 10 having identified the network or networks for which the total criticality score and/or health score is greater than or equal to the predetermined threshold generates corrective actions by analyzing the severity scores recorded during the day.

The list of corrective actions is sent to these devices using, for example, the HTTP (Hypertext Transfer Protocol) or MQTT (Message Queuing Telemetry Transport) protocol.

For example, if a coverage problem is detected, for example by analyzing the severity scores relating to the level of the node or channel change, the incident detection device 10 transfers to the local area network's internet service provider and/or or to the local area network's users a message prompting them to bring a station closer to a node or to add a node to the local area network.

If a coverage type incident is detected, for example, by analyzing the health score and/or the total criticality score of the local area network and/or by analyzing the health score and/or the total criticality score of one or several elements of the local area network and by analyzing the severity scores relating to types of anomalies such as "low power level signal reception" (RSSI<−77 dBm), the incident detection device 10 transfers to the local area network's internet service provider and/or to the local area network's users a message suggesting the addition of a new node (or access point) at the level of the local area network in order improve the overall coverage of the local area network.

For example, if an incorrect node positioning problem is detected, for example by analyzing the severity scores relating to the node or channel change, the incident detection device 10 transfers to the local area network's internet service provider and/or to local area network's users a message prompting them to relocate a node, for example a repeater node of the local area network's internet gateway.

If a frequent node channel change type incident is detected, for example, by analyzing the health score and/or the total criticality score of the local area network and/or by analyzing the health score and/or the total criticality score of one or more elements of the local area network and by analyzing the severity scores relating to types of anomalies such as "frequent channel changes", the incident detection device 10 transfers to the local area network's internet service provider and/or to the local area network's users a message suggesting to the users and/or nodes to determine the channel to be used and/or to modify the local algorithm thresholds that generate channel changes. In another example, the incident detection device 10 informs the local area network or networks concerned by the channel change frequency type incident at the level of one of these nodes in order to implement a corrective action. This is for example to secure the radio channel(s) on which frequent changes are observed.

For example, if a noise problem is detected, for example by analyzing the severity scores relating to the noise level, the incident detection device 10 transfers to the local area network's internet service provider and/or to the local area network's users a message prompting them to relocate or even remove sources of noise and/or, as a corrective action, a message informing a node to change the frequency band.

If a noise type incident is detected, for example, by analyzing the health score and/or the total criticality score of the local area network and/or by analyzing the health score and/or the total criticality score of one or several elements of the local area network and by analyzing the severity scores relating to types of anomalies such as "a very high noise level around a node or station", the incident detection device 10 transfers to the local area network's internet service provider and/or to the local area network's users a message suggesting to the users and/or nodes to switch to another channel and/or Wi-Fi band where the noise level is lower.

For example, if a configuration type incident according to a standard or non-standard protocol is detected, for example, by analyzing the health score and/or the total criticality score of the local area network and/or by analyzing the health score and/or the total criticality score of one or more elements of the local area network and by analyzing the severity scores relating to types of anomalies such as "obsolete standards used", the incident detection device 10 transfers to the local area network's internet service provider and/or to the local area network's users a message suggesting to the users and/or nodes to restore the default Wi-Fi configuration. Alternatively, the incident detection device 10 issues a message to the local area network concerned by the standard configuration or non-standard protocol type incident in order for corrective action to be taken. This corrective measure can be, for example, to prevent a station or terminal in connection with this standard or non-standard protocol from connecting to the local area network concerned.

At step E78, the incident detection device 10 checks if the health score determined for each gateway is modified. If not, the incident detection device 10 interrupts the present algorithm.

If so, the incident detection device 10 moves to step E79 and updates the characteristics of the gateway by modifying the health score.

The invention claimed is:

1. A Method for detecting incidents in a local area network by an incident detection device, the incident detection device being connected to the local area network by means of a wide area network, the local area network comprising a data conditioning and processing device, wherein the method comprises steps, performed by the data conditioning and processing device, comprising:

obtaining by the data conditioning and processing device, from the incident detection device, of a data processing repository for descriptive data from the connections between the stations and the nodes and of descriptive data from the connections between the local area network nodes, aggregation into data groups, by the data conditioning and processing device, of the descriptive data from the connections between the stations and the nodes and the descriptive data from the connections between the nodes if the data processing repository includes information indicating that the data must be aggregated, calculation, by the data conditioning and processing device, of a severity score for each data group, of a severity score for each type of anomaly and the calculation of a total severity score for each data group from the severity scores calculated for the data group if the data processing repository includes information indicating that the severity scores must be calculated, transfer, by the data conditioning and processing device, of aggregated data or severity scores, according to the information included in the data processing repository, to the incident detection device for generation of advisory messages or corrective actions.

2. The method according to claim 1, wherein the data processing repository is determined by the incident detection device from the characteristics of the data conditioning and processing device.

3. The method according to claim 2, wherein the data processing repository is determined by the incident detection device furthermore according to a health score from the local area network determined by the incident detection device from the aggregated data or severity scores.

4. The method according to claim 1, wherein the method causing the incident detection device to perform:

calculation across all of the total severity scores for the groups of aggregated data for a predetermined duration of a total criticality score, the predetermined duration being such that a plurality of data groups are aggregated for the predetermined duration, generation of advisory messages or corrective actions at least from the total criticality score.

5. The method according to claim 4, wherein the method further comprises a step of calculating the average of the total severity scores weighted by the duration of the data groups to obtain the health score for the local area network.

6. The method according to claim 5, wherein the recommendations or corrective actions are further generated from the total health score.

7. The method according to claim 1, wherein the data is aggregated by partitioning the data according to a predetermined periodicity, if, in a partition, no change in the operating characteristic of a link appears, a data group is formed, the data group comprising all the data for the partition and in each partition, at each change of at least one operating characteristic for a link, a data group is formed, which comprises the data for the partition corresponding to the operating characteristic of the link.

8. The method according to claim 1, wherein the recommendations are prompts to bring a station closer to a node of the local area network or to add a node to the local area network or to relocate a node from the local area network or to modify a channel to use or to modify local algorithm thresholds which generate channel changes or to remove sources of noise or to restore a communication protocol configuration and the corrective actions are channel modifications or local algorithm thresholds that generate channel changes.

9. A data conditioning and processing device for the detection of incidents in a local area network by an incident detection device, the incident detection device being connected to the local area network by means of a wide area network, the local area network comprising the data conditioning and processing device, wherein the data conditioning and processing device comprises circuitry causing the data conditioning and processing device to perform:

obtaining from the incident detection device, a data processing repository of descriptive data from the connections between the stations and the nodes and descriptive data from the connections between local area network nodes, aggregating into data groups the descriptive data from the connections between the stations and the nodes and the descriptive data from the connections between the nodes if the data processing repository includes information indicating that the data must be aggregated, calculating a severity score for each data group, a severity score for each type of anomaly and calculating a total severity score for each data group from the severity scores calculated for the data group if the data processing repository includes information indicating that the severity scores must be calculated, transferring aggregated data or severity scores, according to the information included in the data processing repository, to the incident detection device for the generation of advisory messages or corrective actions.

10. A nontransitory storage medium storing a computer program comprising instructions for implementing, by a data conditioning and processing device, the method according to claim 1, when the aforementioned program is executed by a data conditioning and processing device processor.

\* \* \* \* \*